United States Patent
Strein et al.

(10) Patent No.: US 11,356,721 B2
(45) Date of Patent: Jun. 7, 2022

(54) TECHNIQUES FOR AUTOMATICALLY REMOVING CONTENT FROM CLOSED-CAPTION DATA EMBEDDED IN A VIDEO SIGNAL

(71) Applicant: DISNEY ENTERPRISES, INC., Burbank, CA (US)

(72) Inventors: Michael Strein, New York, NY (US); William McLaughlin, Brooklyn, NY (US)

(73) Assignee: Disney Enterprises, Inc., Burbank, CA (US)

(*) Notice: Subject to any disclaimer, the term of this patent is extended or adjusted under 35 U.S.C. 154(b) by 462 days.

(21) Appl. No.: 16/275,144

(22) Filed: Feb. 13, 2019

(65) Prior Publication Data
US 2020/0260129 A1 Aug. 13, 2020

(51) Int. Cl.
*H04N 21/235* (2011.01)
*H04N 21/8405* (2011.01)
*H04N 21/236* (2011.01)

(52) U.S. Cl.
CPC ..... *H04N 21/2358* (2013.01); *H04N 21/2353* (2013.01); *H04N 21/23614* (2013.01); *H04N 21/8405* (2013.01)

(58) Field of Classification Search
CPC .......... H04N 21/2358; H04N 21/2353; H04N 21/23614; H04N 21/8405
See application file for complete search history.

(56) References Cited

U.S. PATENT DOCUMENTS

| | | | |
|---|---|---|---|
| 7,139,031 B1 * | 11/2006 | Bray | H04N 21/439 348/468 |
| 2004/0049780 A1 | 3/2004 | Gee | |
| 2019/0141406 A1 * | 5/2019 | Casagrande | H04N 21/4348 |

* cited by examiner

*Primary Examiner* — Nicholas T Corbo
(74) *Attorney, Agent, or Firm* — Artegis Law Group, LLP

(57) ABSTRACT

Content is automatically removed from closed-caption data embedded in a video signal. A closed-caption compliance system decodes a first portion of a first video frame that includes a closed-caption data packet. The system extracts a first character string that includes at least a portion of the closed-caption data packet. The system determines whether the first character string is suitable for distribution to viewers. If the first character string is suitable for distribution to viewers, then the system encodes at least a first portion of the first character string as a second closed-caption data packet to include in a second video frame. Otherwise, the system modifies the first character string to generate a second character string that is suitable for distribution to viewers; and encodes at least a first portion of the second character string as a third closed-caption data packet to include in the second video frame.

20 Claims, 8 Drawing Sheets

TECHNIQUES FOR AUTOMATICALLY REMOVING CONTENT FROM CLOSED-CAPTION DATA EMBEDDED IN A VIDEO SIGNAL

BACKGROUND OF THE INVENTION

Field of the Invention

The present invention relates generally to video production and, more specifically, to techniques for automatically removing content from closed-caption data embedded in a video signal.

Description of the Related Art

Governmental agencies, such as the Federal Communications Commission (FCC), typically provide guidelines and regulations to ensure that television broadcast programs and other forms of media content, referred to herein as "programs," do not contain profanity and other offensive language. In general, the FCC guidelines and regulations are stricter for broadcasters that transmit programs over the airwaves than for cable operators that transmit or stream programs via a direct connection to each subscriber location. Broadcasters are required to only distribute programs that comply with the relevant governmental guidelines and regulations. Further, broadcasters and other media content providers may have additional internal standards that further restrict the language and content of programs and other media content. Broadcasters and other media content providers distribute programs that meet these additional internal standards in order to provide programs that conform to a consistent branding strategy and that are appropriate for the target audience. In order to conform to governmental guidelines and regulations as well as internal standards, broadcasters and other media content providers oftentimes implement a Broadcast Standards and Practices (BS&P) group. The BS&P group provides internal processes and practices to ensure that all of the programs conform to the relevant governmental guidelines and regulations as well as to the internal standards. Failure to follow the BS&P processes and practices may result in disciplinary action, fines, and, in extreme cases, revocation of a license to broadcast.

Many processes currently exist for removing offensive material from the audio signal and/or video signal of a program. For example, offensive material in the audio signal may be muted or replaced with a tone, in a process colloquially known as "bleeping." Offensive video frames in the video signal may be removed, replaced with frames of black video, or altered by blurring the offensive portion of the video frames. In the case of a live-to-air program, such as an awards show or sports game, the audio and video are delayed by a fixed amount, usually between five and fifteen seconds. In these types of situations, a QC operator views the live-to-air program prior to the fixed delay and removes any offensive audio and video, and the program is then broadcast after the fixed delay. In the case of pre-produced programs, such as serial dramas, feature films, and situational comedies, each program normally undergoes a quality control (QC) process where a QC operator removes or alters offensive audio and video after the program has been produced and delivered, but before the program is broadcasted.

In addition to audio signals and video signals, programs generally include closed-caption data that usually includes a text transcription of the speech and other audio content included in the program, such as sound effects and/or actions that generate sound. Typically, the closed-caption data is encoded into the video signal of a program. When the program is viewed on a television or other display monitor, the closed-caption data is normally enabled as an overlay onto the video signal and viewable as text at the bottom of the television or other display monitor. Closed-caption data may be helpful for a hearing-impaired viewer who cannot hear the audio signal. Additionally, closed-caption data may be helpful in a public space, such as an airport, where viewers are generally not close enough to the display monitor to hear the audio signal.

The process for incorporating closed-caption data into a program differs based on whether the program is a live-to-air program or a pre-produced program. In the case of a live-to-air program, a human stenographer transcribes the audio signal in real-time as the live-to-air program is occurring. The transcription is encoded into the video signal as closed-caption data contemporaneously as the program is broadcast the pre-produced program from the distributor with closed-caption data already encoded into the video signal. In these types of situations, a stenographer, a speech-to-text software application, or other authoring software application first generates a transcription of the audio signal, generally as a string of text. The transcription is then encoded into the video signal as closed-caption data to generate the pre-produced program, which is then delivered to the broadcaster.

One problem with the above approaches for encoding closed-caption data into a video signal is that, even when a QC operator has scrubbed a program for offensive material, certain offensive material may still remain in the closed-caption data. For example, in the case of a live-to-air program, a human stenographer may accidentally transcribe a spoken word that should not be included in the program. Further, in such live scenarios, the stenographer oftentimes receives the audio feed prior to the five to fifteen second delay. Therefore, offensive material in the audio has not yet been bleeped out of the audio received by the stenographer. As a result, the offensive closed-caption data may be broadcast even if the offensive material has been removed successfully from the audio signal and video signal. In the case of a pre-produced program, an accurate closed-caption transcription may still include offensive words that were bleeped out of the audio signal. Among other things, removing and/or replacing closed-caption data is typically time-consuming, labor intensive, and prone to error. The closed-caption data first has to be decoded from the video signal and displayed as text. A QC operator then has to read and revise the text by manually, removing and/or replacing any offensive words. The revised text then has to be re-encoded into the video signal. Not only do mistakes occur in this process, in cases where a pre-produced program is delivered very close to air time, there may be insufficient time to read and revise the closed-caption data.

As the foregoing illustrates, what is needed in the art are more effective techniques for removing unwanted content from closed-caption data.

SUMMARY OF THE INVENTION

Various embodiments of the present application set forth a computer-implemented method for automatically removing content from closed-caption data embedded in a video signal. The method includes decoding a first portion of a first video frame that includes a first closed-caption data packet. The method further includes extracting a first character string that includes at least a portion of the first closed-caption data packet. The method further includes determining whether the first character string is suitable for distribution to viewers. If the first character string is suitable for distribution to viewers, then the method includes encoding at least a first portion of the first character string as a second closed-caption data packet to include in a second video frame. Otherwise, if the first character string is not suitable for distribution to viewers, then the method further includes modifying the first character string to generate a second character string that is suitable for distribution to viewers. In such cases, the method further includes encoding at least a first portion of the second character string as a third closed-caption data packet to include in the second video frame.

Other embodiments of the present invention include, without limitation, a computer-readable medium including instructions for performing one or more aspects of the disclosed techniques, as well as a computing device for performing one or more aspects of the disclosed techniques.

At least one technical advantage of the disclosed techniques relative to the prior art is that offensive material in embedded closed-caption data can be automatically removed or replaced in both live-to-air and pre-produced programs anywhere in the video production pipeline. As a result, broadcasters can flexibly deploy the disclosed techniques at any one or more points in the video production pipeline based on where the programs are stored or distributed. Another technical advantage of the disclosed techniques relative to the prior art is that offensive material in embedded closed-caption data can be removed or replaced with little or no human intervention. Therefore, offensive material may be removed contemporaneously as a live-to-air program is being broadcast. Further, by eliminating manual reading and revising of decoded closed-caption text, offensive material can be removed from a pre-produced program even when the pre-produced program is delivered close to air time. By implementing the disclosed techniques, offensive material can removed from closed-caption data with increased effectiveness and efficiency relative to prior techniques that involve human QC operators. These technical advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
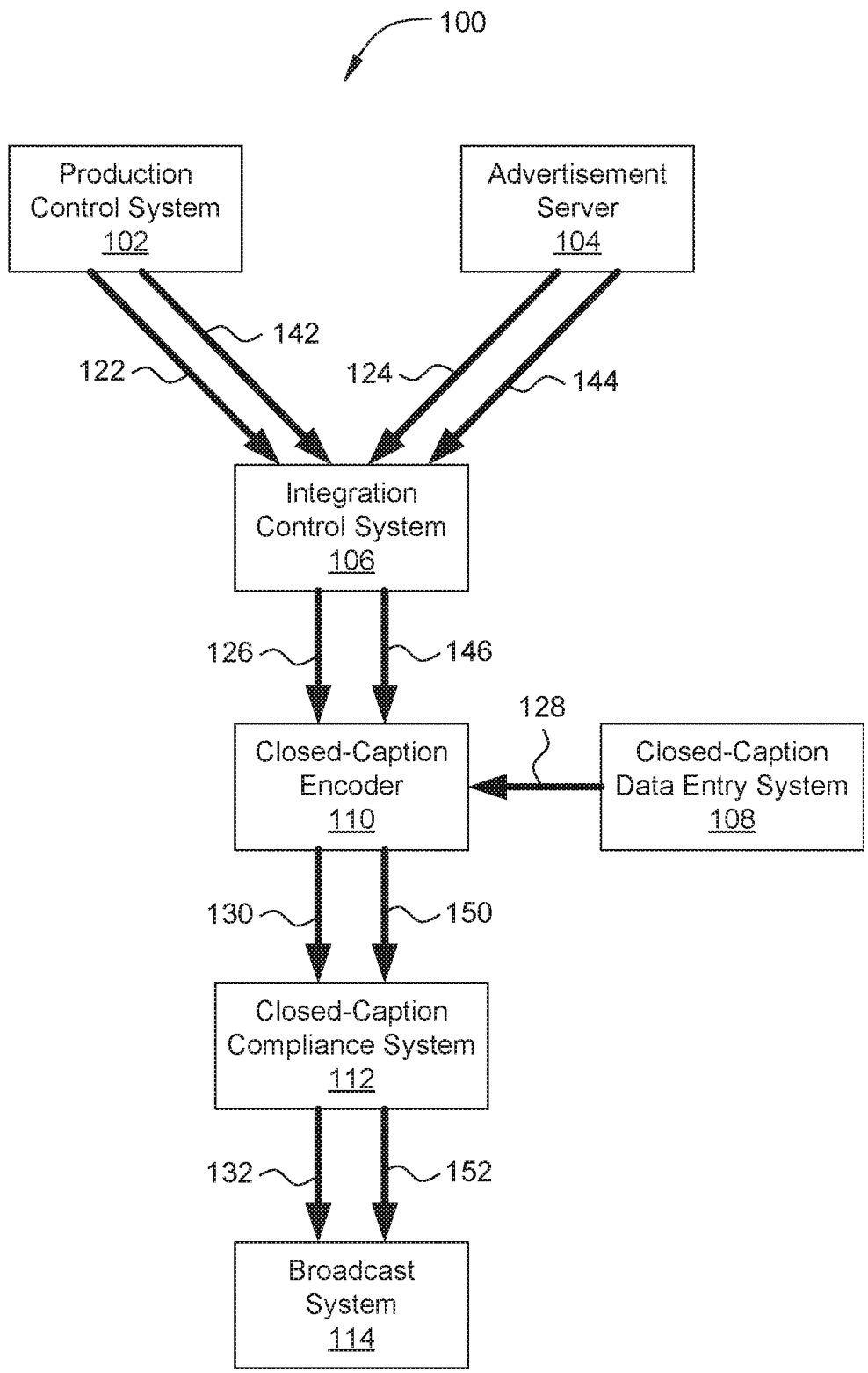
FIG. 1 illustrates a system configured to implement one or more aspects of the present invention.

FIG. 1 illustrates a system 100 configured to implement one or more aspects of the present invention. As shown, the system includes, without limitation, a production control system 102, an advertisement server 104, an integration control system 106, a closed-caption encoder 110, a closed-caption data entry system 108, a closed-caption compliance system 112, and a broadcast system 114.

Production control system 102 includes, without limitation, a computing device that may be a standalone server, a cluster or "farm" of servers, one or more network appliances, or any other device suitable for implementing one or more aspects of the present invention. Illustratively, production control system 102 communicates with integration control system 106 via communications link 122 and video link 142. Communications link 122 could be any suitable channel to enable communications among remote or local computer systems and computing devices, including, without limitation, wireless and wired LANs (Local Area Networks) and Internet-based WANs (Wide Area Networks). Video link 142 could be any suitable channel to carry a video signal that is capable of supporting closed-caption data. Video link 142 may be compatible with one or more video interface standards defined by the Society of Motion Picture and Television Engineers (SMPTE), including, without limitation, SMPTE 259 (for standard definition video), SMPTE 292 (for high definition video), and SMPTE 2110 (for video over IP).

In operation, production control system 102 generates the program segments for a live program. Each program segment typically includes various visual elements, such as action shots, interviews, graphics, field reports, and so on. Production control system 102 includes cameras, audio production equipment, video production equipment, and other equipment needed to generate a live video production. Production control system 102 transmits the live video production with audio, video, and graphics to integration control system 106.

Advertisement server 104 includes, without limitation, a computing device that may be a standalone server, a cluster or "farm" of servers, one or more network appliances, or any other device suitable for implementing one or more aspects of the present invention. Illustratively, advertisement server 104 communicates with integration control system 106 via communications link 124 and video link 144. Communications link 124 could be any suitable channel to enable communications among remote or local computer systems and computing devices, including, without limitation, wireless and wired LANs and Internet-based WANs. Video link 144 could be any suitable channel to carry a video signal that is capable of supporting closed-caption data. Video link 144 may be compatible with one or more video interface standards defined by SMPTE, including, without limitation, SMPTE 259 (for standard definition video), SMPTE 292 (for high definition video), and SMPTE 2110 (for video over IP).

In operation, advertisement server 104 includes the inventory of commercial advertisements that have been sold for a particular live program. In some embodiments, advertisement server 104 may also include a data record of the approximate air times for each of the commercials to be played during the live program. Upon request, advertisement server 104 transmits one or more advertisements to integration control system 106 when the live-to-air program suspends for a commercial break.

Integration control system 106 includes, without limitation, a computing device that may be a standalone server, a cluster or "farm" of servers, one or more network appliances, or any other device suitable for implementing one or more aspects of the present invention. Illustratively, integration control system 106 communicates with closed-caption encoder 110 via communications link 126 and video link 146. Communications link 126 could be any suitable channel to enable communications among remote or local computer systems and computing devices, including, without limitation, wireless and wired LANs and Internet-based WANs. Video link 146 could be any suitable channel to carry a video signal that is capable of supporting closed-caption data. Video link 146 may be compatible with one or more video interface standards defined by SMPTE, including, without limitation, SMPTE 259 (for standard definition video), SMPTE 292 (for high definition video), and SMPTE 2110 (for video over IP).

In operation, integration control system 106 switches between broadcasting program segments received from production control system 102 and commercial advertisements received from advertisement server 104. During a live program segment, integration control system 106 broadcasts a video feed from production control system 102. At the end of a program segment, integration control system 106 switches from broadcasting a video feed from production control system 102 to broadcasting a video feed from advertisement server 104. After airing the commercials, integration control system 106 switches from broadcasting a video feed from advertisement server 104 to broadcasting a video feed from production control system 102. In this manner, integration control system 106 transmits a live-to-air program including commercial advertisements to closed-caption encoder 110.

Closed-caption data entry system 108 includes, without limitation, a computing device that may be a standalone server, a cluster or "farm" of servers, one or more network appliances, or any other device suitable for implementing one or more aspects of the present invention. Illustratively, closed-caption data entry system 108 communicates with closed-caption encoder 110 via communications link 128. Communications link 128 could be any suitable channel to enable communications among remote or local computer systems and computing devices, including, without limitation, wireless and wired LANs and Internet-based WANs.

In operation, closed-caption data entry system 108 transmits a transcription of a live-to-air program to closed-caption encoder 110 as a series of characters. In some embodiments, closed-caption data entry system 108 may be remotely located from closed-caption encoder 110. In such embodiments, communications link 128 may be a remote connection, including, without limitation, a dial-in modem connection or an Internet connection. A human stenographer views the live-to-air program and transcribes the audio as the words are being spoken in the live-to-air program via a keyboard associated with closed-caption data entry system 108. Closed-caption data entry system 108 transmits the transcription to closed-caption encoder 110 as ASCII characters, including alphanumeric characters, control characters, font information, and positional information and commands, such as to roll up or flip up the closed-caption text to the next line.

Closed-caption encoder 110 includes, without limitation, a computing device that may be a standalone server, a cluster or "farm" of servers, one or more network appliances, or any other device suitable for implementing one or more aspects of the present invention. Illustratively, closed-caption encoder 110 communicates with closed-caption compliance system 112 via communications link 130 and video link 150. Communications link 130 could be any suitable channel to enable communications among remote or local computer systems and computing devices, including, without limitation, wireless and wired LANs and Internet-based WANs. Video link 150 could be any suitable channel to carry a video signal that is capable of supporting closed-caption data. Video link 150 may be compatible with one or more video interface standards defined by SMPTE, including, without limitation, SMPTE 259 (for standard definition video), SMPTE 292 (for high definition video), and SMPTE 2110 (for video over IP).

In operation, closed-caption encoder 110 receives a transcription of a live-to-air program from closed-caption data entry system 108 as a series of characters. Closed-caption encoder 110 encodes the text into closed-caption data packets. Typically, the closed-caption data packets conform to one or both of the Consumer Electronics Association (CEA) 608 and CEA 708 standards. These standards are also referred to herein as the Electronic Industries Alliance (EIA) 608 and EIA 708 standards. Closed-caption encoder 110 embeds the closed-caption data packets as ancillary data in the video signal of the live-to-air program received from integration control system 106. Closed-caption encoder 110 transmits the live-to-air program with the embedded closed-caption data packets to closed-caption compliance system 112.

Closed-caption compliance system 112 includes, without limitation, a computing device that may be a standalone server, a cluster or "farm" of servers, one or more network appliances, or any other device suitable for implementing one or more aspects of the present invention. Illustratively, closed-caption compliance system 112 communicates with broadcast system 114 via communications link 132 and video link 152. Communications link 132 could be any suitable channel to enable communications among remote or local computer systems and computing devices, including, without limitation, wireless and wired LANs and Internet-based WANs. Video link 152 could be any suitable channel to carry a video signal that is capable of supporting closed-caption data. Video link 152 may be compatible with one or more video interface standards defined by SMPTE, including, without limitation, SMPTE 259 (for standard definition video), SMPTE 292 (for high definition video), and SMPTE 2110 (for video over IP).

In operation, closed-caption compliance system 112 decodes closed-caption data packets from a video signal of a live-to-air program. Because a small number of closed-caption characters are encoded into each video frame, closed-caption compliance system 112 stores closed-caption data packets frame-by-frame in a buffer over a period of several frames to reconstruct a single word. Closed-caption compliance system 112 may store the closed-caption data packets in any technically feasible location, including, without limitation, a buffer in memory, a database, a data storage device, or any other suitable data structure or memory device. For convenience, any suitable data structure or device for storing one or more closed-caption data packets is referred to herein as a buffer. Once closed-caption compliance system 112 has buffered a partial word or a whole word, closed-caption compliance system 112 extracts a character string from the buffer, where the character string includes a partial word or a complete word. Closed-caption compliance system 112 compares the character string against a data library of known offensive words. Closed-caption compliance system 112 maintains and updates the data library by adding and deleting offensive words as needed. If a character string matches with an offensive word, then closed-caption compliance system 112 tags the character string as blocked and applies an action to remove the offensive word in the character string or replace one or more characters of the offensive word in the character string with alternate characters, such as asterisks (*). If a character string does not match any offensive word, then closed-caption compliance system 112 tags the character string as cleared and inserts the characters of the word into closed-caption data packets.

If a partial word in a character string matches to a portion of an offensive word, closed-caption compliance system 112 places the partial word in a character string in the buffer. Closed-caption compliance system 112 tags the partially reconstructed word as a probationary word. Closed-caption compliance system 112 inserts alternate characters, such as null characters, into the closed-caption data packets while a buffered word is tagged as probationary. After one or more additional closed-caption data packets are decoded, closed-caption compliance system 112 detects that the end of the probationary word has been reached. If the probationary word extracted from the buffer matches with an offensive word, then closed-caption compliance system 112 applies an action to remove the offensive word or replace one or more characters of the offensive word with alternate characters, such as asterisks (*). If the probationary word does not match any offensive word, then closed-caption compliance system 112 tags the character string as cleared and inserts the characters of the word into closed-caption data packets.

The process described above introduces frames of delay in closed-caption data. Because offensive words tend to be relatively short, the delay in closed-caption data packets introduced by closed-caption compliance system 112 is likely to be a small number of video frames. In some embodiments, closed-caption compliance system 112 delays the audio signal and/or video signal to account for the delay in closed-caption data packets. After removing offensive words, closed-caption compliance system 112 encodes the now compliant closed-caption data packets into the outgoing video frames and transmits the video frames to broadcast system 114.

Broadcast system 114 includes, without limitation, a computing device that may be a standalone server, a cluster or "farm" of servers, one or more network appliances, or any other device suitable for implementing one or more aspects of the present invention. In operation, broadcast system 114 receives a live-to-air program from closed-caption compliance system 112, where offensive words have been removed from the closed-caption data packets. Upon receiving the live-to-air program, broadcast system 114 transmits the live-to-air program for broadcast.

It will be appreciated that the system shown herein is illustrative and that variations and modifications are possible. In one example, closed-caption compliance system 112 is illustrated as a standalone unit. Additionally or alternatively, the functions of closed-caption compliance system 112 could be integrated into one or more other units shown in the system 100 of FIG. 1, including, without limitation, closed-caption encoder 110 and broadcast system 114.

In another example, although the system 100 of FIG. 1 is illustrated with one production control system 102, one advertisement server 104, one integration control system 106, one closed-caption data entry system 108, one closed-caption encoder 110, one closed-caption compliance system 112, and one broadcast system 114, the system 100 could include any technically feasible number of production control systems 102, advertisement servers 104, integration control systems 106, closed-caption data entry systems 108, closed-caption encoders 110, closed-caption compliance systems 112, and broadcast systems 114 within the scope of the present disclosure.

In yet another example, production control system 102, advertisement server 104, integration control system 106, closed-caption data entry system 108, closed-caption encoder 110, closed-caption compliance system 112, and broadcast system 114 are depicted as communicating over point-to-point communications links. Additionally or alternatively, production control system 102, advertisement server 104, integration control system 106, closed-caption data entry system 108, closed-caption encoder 110, closed-caption compliance system 112, and broadcast system 114 could communicate over one or more communications networks. Such communications networks could be any suitable environment to enable communications among remote or local computer systems and computing devices, including, without limitation, wireless and wired LANs and Internet-based WANs.

Figure 2:
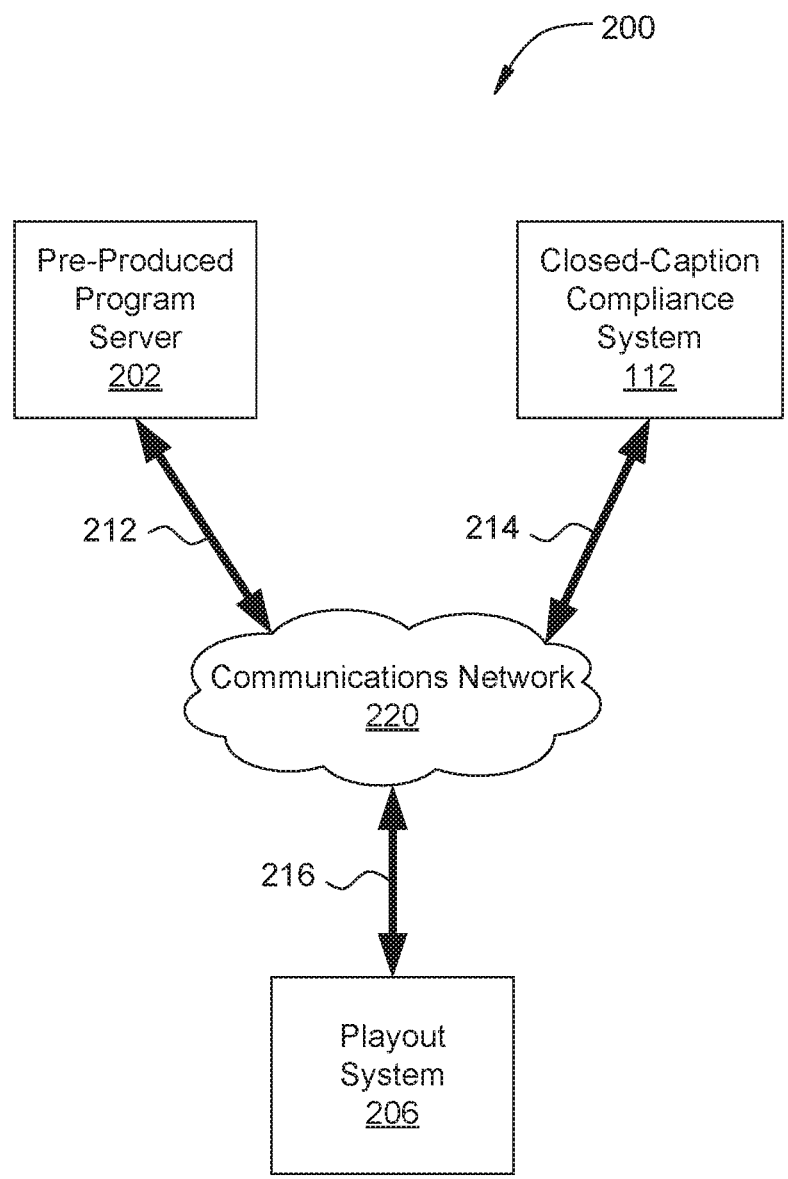
FIG. 2 illustrates another system configured to implement one or more further aspects of the present invention.

FIG. 2 illustrates another system 200 configured to implement one or more further aspects of the present invention. As shown, the system includes, without limitation, a pre-produced program server 202, a closed-caption compliance system 112, and a playout system 206, in communication with each other via a communications network 220. Communications network 220 may be any suitable environment to enable communications among remote or local computer systems and computing devices, including, without limitation, wireless and wired LANs and internet-based WANs.

Pre-produced program server 202 includes, without limitation, a storage device that may be a standalone networked attached storage (NAS) system, a storage area-network (SAN), a cluster or "farm" of storage devices, a distributed storage architecture, or any other device suitable for implementing one or more aspects of the present invention. Additionally or alternatively, pre-produced program server 202 may include, without limitation, a computing device with a storage subsystem that may be a standalone server, a cluster or "farm" of servers, one or more network appliances, or any other device suitable for implementing one or more aspects of the present invention. Illustratively, pre-produced program server 202 communicates over communications network 220 via communications link 212. In operation, pre-produced program server 202 stores pre-produced programs, such as serial dramas, feature films, and situational comedies. The pre-produced programs include embedded closed-caption data packets that may or may not be compliant with BS&P guidelines. Typically, the closed-caption data packets conform to one or both of the CEA 608 and CEA 708 standards. These standards are also referred to herein as the EIA 608 and EIA 708 standards. The closed-caption data packets are embedded as ancillary data in the video signal of the pre-produced program stored on pre-produced program server 202. The pre-produced programs stored on pre-produced program server 202 are processed by closed-caption compliance system 112 before the pre-produced programs are broadcast.

Closed-caption compliance system 112 includes, without limitation, a computing device that may be a standalone server, a cluster or "farm" of servers, one or more network appliances, or any other device suitable for implementing one or more aspects of the present invention. Illustratively, closed-caption compliance system 112 communicates over communications network 220 via communications link 214. In operation, closed-caption compliance system 112 decodes closed-caption data packets from a video signal of a pre-produced program stored on pre-produced program server 202. Because a small number of closed-caption characters are encoded into each video frame, closed-caption compliance system 112 stores closed-caption data packets from frames that precede and/or follow the current frame in a buffer over a period of several frames to reconstruct a single word. Once closed-caption compliance system 112 has buffered a whole word, closed-caption compliance system 112 extracts a character string from the buffer, where the character string includes the complete word. Closed-caption compliance system 112 compares the character string against a data library of known offensive words. Closed-caption compliance system 112 maintains and updates the data library by adding and deleting offensive words as needed. If a character string matches with an offensive word, then closed-caption compliance system 112 tags the character string as blocked and applies an action to remove the offensive word in the character string or replace one or more characters of the offensive word in the character string with alternate characters, such as asterisks (*). If a character string does not match any offensive word, then closed-caption compliance system 112 tags the character string as cleared and inserts the characters of the word into closed-caption data packets. After removing offensive words, closed-caption compliance system 112 encodes the now compliant closed-caption data packets into the video frames of the pre-produced program.

In some embodiments, closed-caption compliance system 112 may process pre-produced programs as the programs are published on pre-produced program server 202. After processing, closed-caption compliance system 112 may replace the original pre-produced program with the version of the program without the offensive closed-caption material. Additionally or alternatively, closed-caption compliance system 112 may leave the original pre-produced program in place and add a new version of the program without the offensive closed-caption material. In some embodiments, closed-caption compliance system 112 may process pre-produced programs dynamically as the programs are streamed from pre-produced program server 202 and before being broadcast by playout system 206.

Playout system 206 includes, without limitation, a storage device that may be a standalone networked attached storage (NAS) system, a storage area-network (SAN), a cluster or "farm" of storage devices, a distributed storage architecture, or any other device suitable for implementing one or more aspects of the present invention. Additionally or alternatively, playout system 206 may include, without limitation, a computing device with a storage subsystem that may be a standalone server, a cluster or "farm" of servers, one or more network appliances, or any other device suitable for implementing one or more aspects of the present invention. Illustratively, playout system 206 communicates over communications network 220 via communications link 216. In operation, playout system 206 retrieves pre-produced programs from pre-produced program server 202, where offensive words have been removed from the closed-caption data packets. Upon retrieving the pre-produced programs, playout system 206 transmits the pre-produced programs for broadcast.

It will be appreciated that the system shown herein is illustrative and that variations and modifications are possible. In one example, closed-caption compliance system 112 is illustrated as a standalone unit. Additionally or alternatively, the functions of closed-caption compliance system 112 could be integrated into one or more other units shown in the system 200 of FIG. 2, including, without limitation, pre-produced program server 202 and playout system 206. Additionally or alternatively, the functions of closed-caption compliance system 112 could be included as part of a cloud-based service, including, without limitation, a video streaming system or a /video-on-demand system.

In another example, although the system 200 of FIG. 2 is illustrated with one pre-produced program server 202, one closed-caption compliance system 112, and one playout system 206, the system 200 could include any technically feasible number of pre-produced program servers 202, closed-caption compliance systems 112, and playout systems 206 within the scope of the present disclosure.

In yet another example, pre-produced program server 202, closed-caption compliance system 112, and playout system 206 are depicted as communicating a communications network 220. Additionally or alternatively, pre-produced program server 202, closed-caption compliance system 112, and playout system 206 could communicate over one or more point-to-point communications links.

Various techniques for automated removal of offensive content from closed-caption data are now described in further detail.

Automatically Removing Content from
Closed-Caption Data

Figure 3:
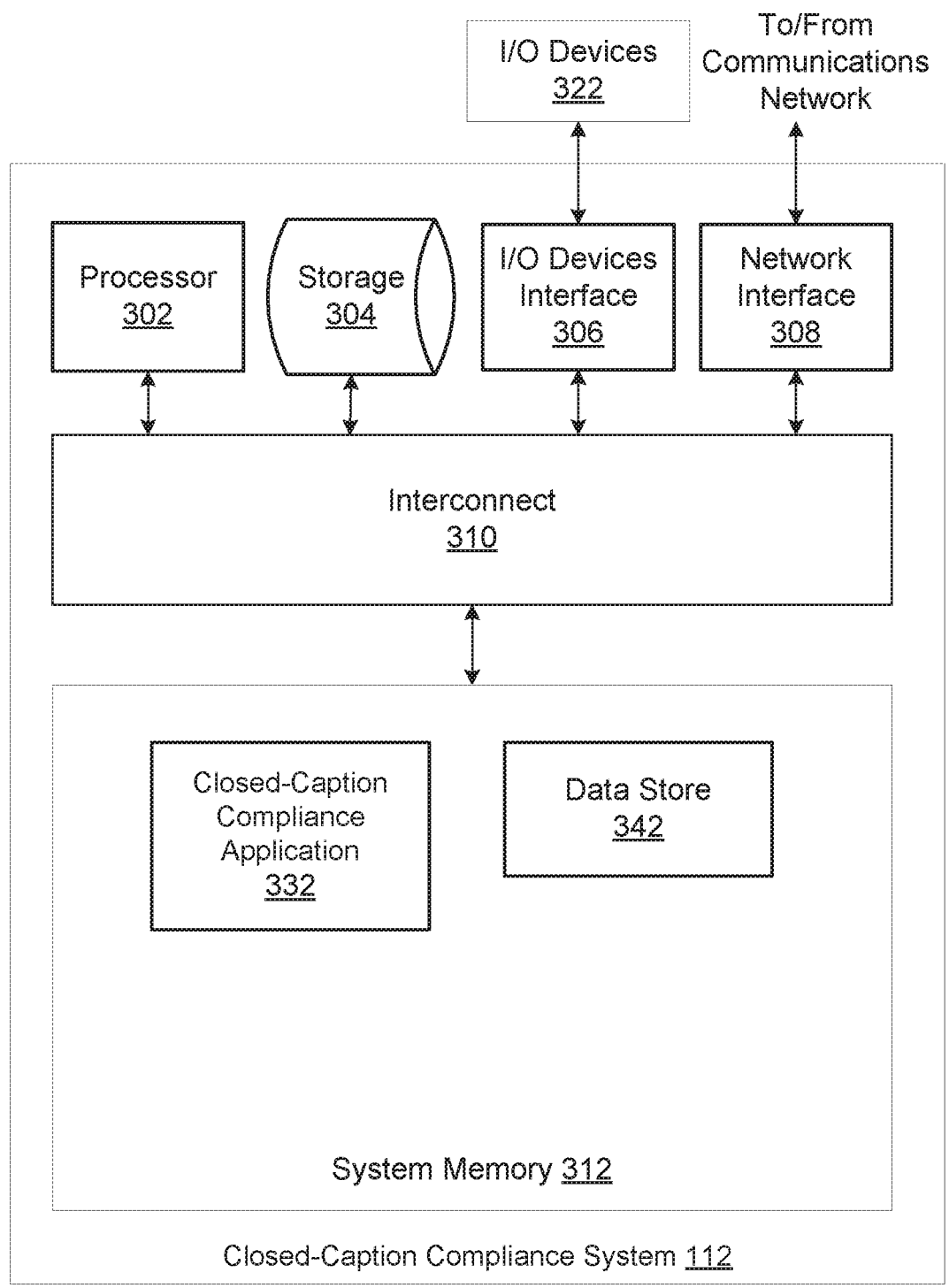
FIG. 3 is a more detailed illustration of the closed-caption compliance system of FIGS. 1-2, according to various embodiments of the present invention.

FIG. 3 is a more detailed illustration of the closed-caption compliance system 112 of FIGS. 1-2, according to various embodiments of the present invention. As shown, closed-caption compliance system 112 includes, without limitation, a processor 302, storage 304, an input/output (I/O) devices interface 306, a network interface 308, an interconnect 310, and a system memory 312.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a television that includes a broadcast or cable tuner for receiving digital or analog television signals. The display device may be included in a virtual reality (VR) or augmented reality (AR) headset. Further, the display device may project an image onto one or more surfaces, such as walls or projection screens.

Processor 302 is included to be representative of a single central processing unit (CPU), multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, a closed-caption compliance application 332 and a data store 342. The closed-caption compliance application 332, when executed by the processor 302, performs one or more operations associated with the closed-caption compliance system 112 of FIGS. 1-2, as further described herein. In performing these operations, closed-caption compliance application 332 stored data in and retrieves data from data store 342.

In operation, closed-caption compliance application 332 automatically removes and replaces offensive material included in closed-caption data within pre-produced or live-to-air programs. Closed-caption compliance application 332 decodes video frames on a frame-by-frame basis to extract the closed-caption data packets encoded and embedded into the video frames.

Each video frame includes a closed-caption data packet that includes a number of characters. In general, a single closed-caption data packet is an arbitrary string of characters and does not align on word or sentence boundaries. For example, a particular closed-caption data packet could include only a portion of a word. Another closed-caption data packet could include the end of a first word, a space character, and the beginning of a second word. Consequently, closed-caption compliance application 332 buffers and stores the closed-caption data packets in data store 342 n sequence over multiple video frames in order to extract partial or complete words, phrases, and full sentences.

Closed-caption data packets that conform to the EIA 608 standard are restricted to two characters per packet. Closed-caption data packets that conform to the EIA 708 standard may have more than two characters per packet. However, closed-caption data packets are oftentimes limited to two characters per packet where the video frames include both EIA 608 closed-caption data and EIA 708 closed-caption data. As a result, the EIA 608 closed-caption data remains aligned with the EIA 708 closed-caption data.

As each closed-caption data packet is processed, closed-caption compliance application 332 searches a buffer in data store 342 for a partial word that was extracted from one or more closed-caption data packets included in prior video frames. If the buffer does not include such a partial word, then the current closed-caption data packet includes the beginning of a new word. Closed-caption compliance application 332 stores the beginning of the new word in the buffer. If the buffer does not include such a partial word, then the current closed-caption data packet includes additional characters of the partial word. Closed-caption compliance application 332 concatenates the current closed-caption data packet to the partial word and stores the partial word in the buffer. Further, closed-caption compliance application 332 identifies the end of the current word when the current closed-caption data packet includes particular characters, such as a period, semicolon, space, or hyphen.

After processing the current closed-caption data packet and updating the buffer, closed-caption compliance application 332 compares the current partial or complete word stored in the buffer against a blacklist and a whitelist included in a data library. The blacklist includes words that are offensive and should be removed or replaced when encountered. In the context of this disclosure, offensive words in the blacklist may include, without limitation, profanity, racial slurs, societally sensitive words, religiously offensive words, and words banned by a governmental agency or regulatory authority. The whitelist includes words that are permitted but include a subset of letters that may form an offensive word included on the blacklist. As one example, the word "mishit" could be included on the whitelist, whereas the word formed by the last four letters of "mishit" could be included on the blacklist.

Closed-caption compliance application 332 first compares the current partial or complete word stored in the buffer against the blacklist. If no portion of the current partial or complete word matches any portion of any word on the blacklist, then closed-caption compliance application 332 tags the current word as cleared. Closed-caption compliance application 332 encodes the characters of the current word as closed-caption data and embeds the closed-caption data into one or more video frames of the program.

If any portion of the current word matches any portion of any word on the blacklist, then closed-caption compliance application 332 proceeds differently depending on whether the current word is a partial word or a complete word. If the current word is a complete word, then closed-caption compliance application 332 compares the current complete word stored in the buffer against the whitelist. If the current word matches any word on the whitelist, then closed-caption compliance application 332 tags the current word as cleared. Closed-caption compliance application 332 encodes the characters of the current word as closed-caption data and embeds the closed-caption data into one or more video frames of the program. If the current word does not match any word on the whitelist, then closed-caption compliance application 332 tags the current word as blocked. Closed-caption compliance application 332 alters the word by removing or replacing one or more characters of the current word. Closed-caption compliance application 332 encodes the characters of the altered word as closed-caption data and embeds the closed-caption data into one or more video frames of the program.

If, on the other hand, the current word is a partial word, then closed-caption compliance application 332 tags the current word as probationary because the current word may be offensive, depending on the remaining characters of the word. Closed-caption compliance application 332 holds the partial word in the buffer and extracts additional characters from subsequent closed-caption data packets. Closed-caption compliance application 332 continues to tag the current word as probationary until closed-caption compliance application 332 detects the end of the current word, such as by detecting a period, space, or hyphen. Upon detecting the end of the current word, closed-caption compliance application 332 processes the complete word as set forth above. In some embodiments, while the current word is tagged as probationary, closed-caption compliance application 332 may insert a substitute character, such as a null character, in the closed-caption data packets of one or more video frames. Null characters indicate that closed-caption data is present in the frame, but the closed-caption decoder at the receiver does not overlay any characters on the screen or move the current cursor location. In these embodiments, closed-caption compliance application 332 may continue to receive and transmit frames while a current word is probationary, thereby avoiding dropping video frames in a live-to-air program.

When altering a blocked word, closed-caption compliance application 332 may apply any one or more rules to remove or replace characters in the blocked word. Closed-caption compliance application 332 may replace the characters of the altered word with null characters. As a result, the blocked word is effectively removed from the closed-caption data. Additionally or alternatively, closed-caption compliance application 332 may replace all of the characters in the blocked word with a substitute character, such as an asterisk (*) or any other suitable character. Additionally or alternatively, closed-caption compliance application 332 may replace some of the characters in the blocked word with a substitute character, such as an asterisk (*) or any other suitable character. For example, closed-caption compliance application 332 could replace the vowels of the blocked word or could replace only the portion of the blocked word that matches a word on the blacklist. Additionally or alternatively, closed-caption compliance application 332 may replace the blocked word with an alternative word specified in the blacklist.

In some embodiments, closed-caption compliance application 332 may analyze multiple words and/or phrases to determine the context and usage of a particular word within a sentence. If a particular word is offensive in a first context but not in a second context, closed-caption compliance application 332 may tag the word as blocked when the word is presented in the first context but tag the word as cleared when the word is presented in the second context.

In some embodiments, closed-caption compliance application 332 may generate a report upon tagging a word as blocked. The report may include a message that includes the blocked word, the action taken to alter the word, and the time code corresponding one or more video frames that include the closed-caption data where the blocked word was encountered. Additionally or alternatively, closed-caption compliance application 332 may generate a report after processing the entire program. The report may include a list of all the blocked words, the action taken to alter each of the blocked words, and the time codes corresponding to where the blocked word was encountered. Closed-caption compliance application 332 may store the reports in data store 342 for later retrieval and/or transmission. A QC operator may review the report to determine how well the program originator complied with BS&P standards. The QC operator may also determine how well closed-caption compliance application 332 is performing in order to guide subsequent revisions of the word lists. The QC operator may then add words to or remove words from either or both of the blacklist and the whitelist for processing subsequent programs.

Figure 4A:
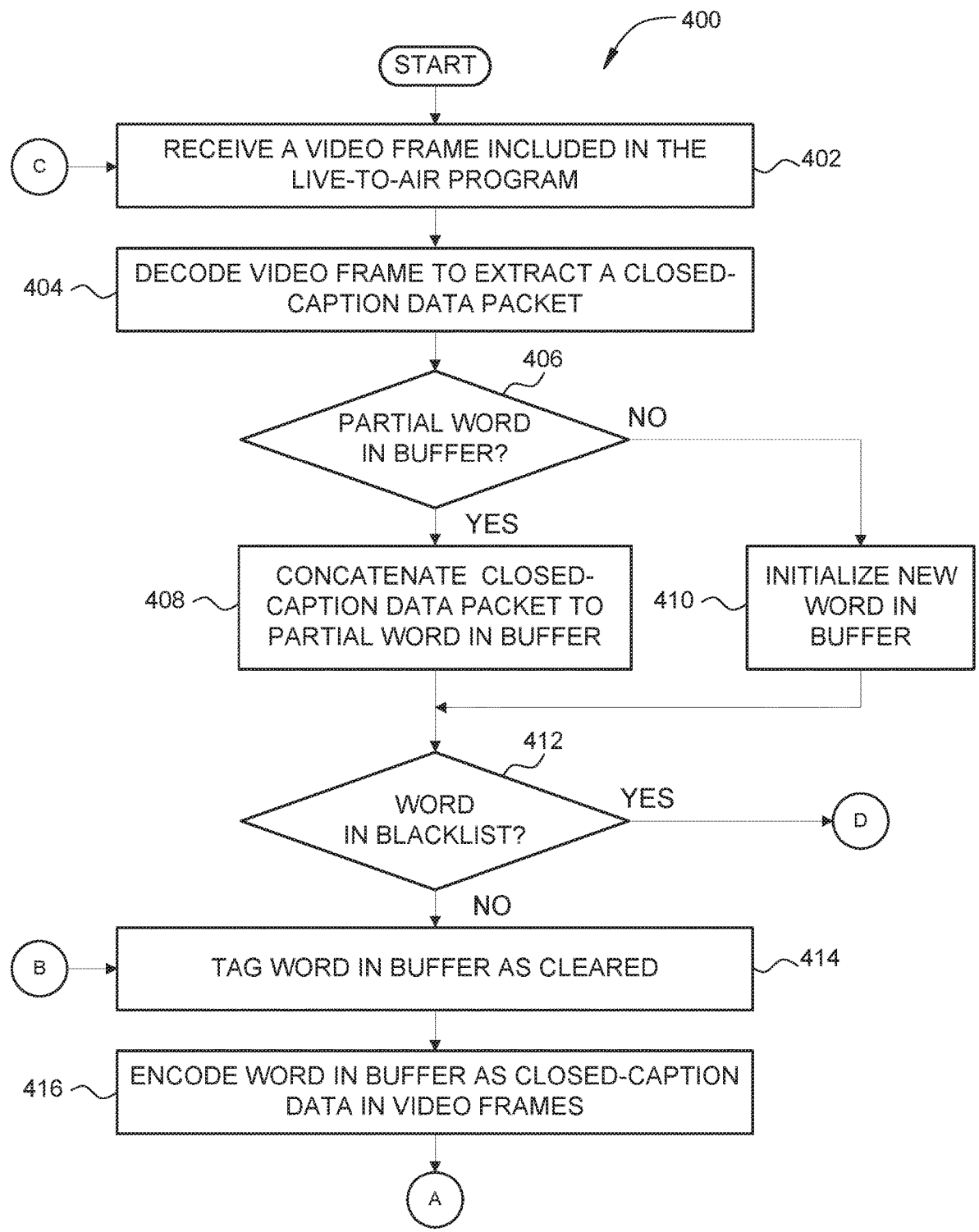
FIGS. 4A-4C set forth a flow diagram of method steps for automatically removing content from closed-caption data included in a live-to-air program, according to various embodiments of the present invention.
Figure 4B:
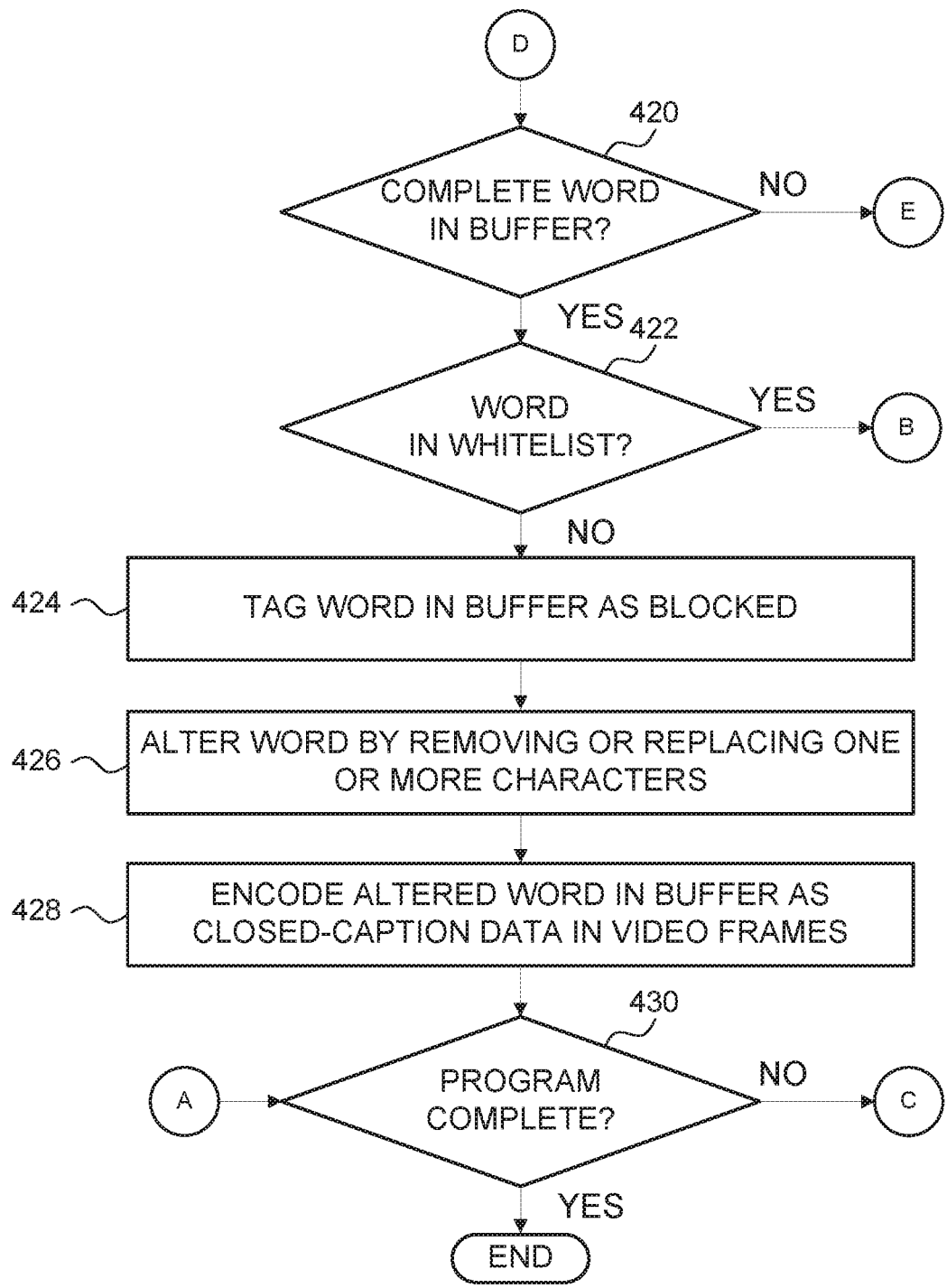
Figure 4C:
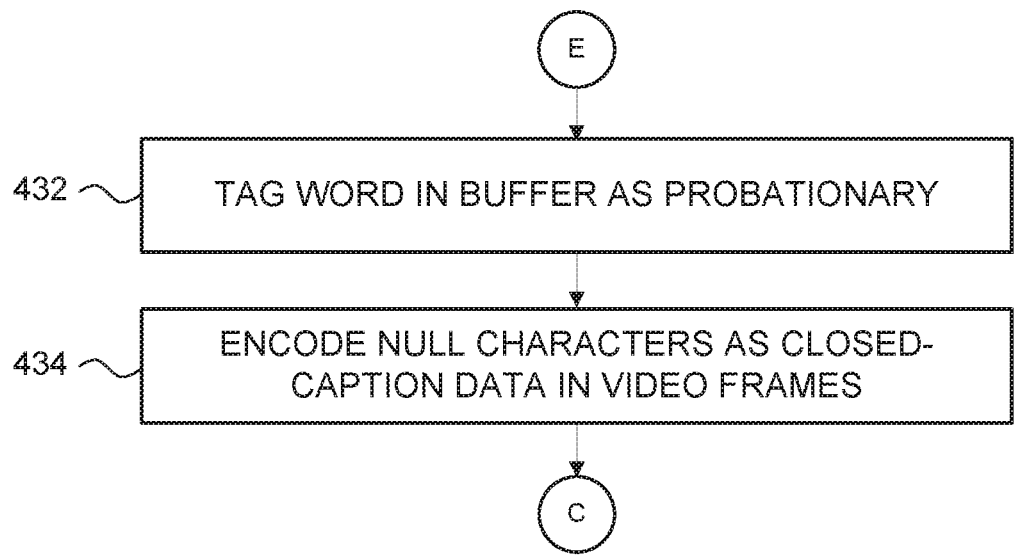

FIGS. 4A-4C set forth a flow diagram of method steps for automatically removing content from closed-caption data included in a live-to-air program, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 400 begins at step 402, where a closed-caption compliance application 332 executing on a closed-caption compliance system 112 receives a video frame of the live-to-air program that includes closed-caption data. The closed-caption data conforms to at least one of the EIA 608 and EIA 708 closed-caption standards. At step 404, closed-caption compliance application 332 decodes the video frame to extract a closed-caption data packet.

At step 406, closed-caption compliance application 332 determines whether a partial word is currently stored in a buffer within data store 342. If a partial word is currently stored in the buffer, then the method 400 proceeds to step 408, where closed-caption compliance application 332 concatenates the extracted closed-caption data packet to the partial word currently stored in the buffer. The method then proceeds to step 412. If, on the other hand, no partial word is currently stored in the buffer, then the method 400 proceeds to step 410, where closed-caption compliance application 332 initializes a new word by storing the extracted closed-caption data packet in the buffer. The method then proceeds to step 412, where closed-caption compliance application 332 determines whether any part of the current word in the buffer is included in any word in the blacklist. If no part of the current word in the buffer is included in any word in the blacklist, then the method proceeds to step 414, where closed-caption compliance application 332 tags the current word as cleared. At step 416, closed-caption compliance application 332 encodes the current word in the buffer into one or more video frames as closed-caption data.

At step 430, closed-caption compliance determines whether processing of the program is complete. If processing of the program is not complete, then the method 400 proceeds to step 402, described above. If processing of the program is complete, then the method 400 terminates.

Returning to step 412, if any part of the current word in the buffer is included in any word in the blacklist, then the method proceeds to step 420, where closed-caption compliance application 332 determines whether the current word stored in the buffer is a complete word. The current word stored in the buffer is a complete word if caption compliance application 332 detects a character that indicates the end of a word, such as a period, space, or hyphen.

If the current word stored in the buffer is a complete word, then the method proceeds to step 422, where closed-caption compliance application 332 determines whether the current word in the buffer is included in any word in the whitelist. If the current word in the buffer is included in any word in the whitelist, then the method 400 proceeds to step 414, described above. If, however, current word in the buffer is not included in any word in the whitelist, then the method 400 proceeds to step 424, where closed-caption compliance application 332 tags the current word as blocked. At step 426, closed-caption compliance application 332 alters the blocked word by removing or replacing one or more characters of the blocked word. At step 428, closed-caption compliance application 332 encodes the altered word into one or more video frames as closed-caption data.

At step 430, closed-caption compliance determines whether processing of the program is complete. If processing of the program is not complete, then the method 400 proceeds to step 402, described above. If processing of the program is complete, then the method 400 terminates.

Returning to step 420, if the current word stored in the buffer is not a complete word, then the method proceeds to step 432, where closed-caption compliance application 332 tags the partial word as probationary. At step 434, encodes the null characters into one or more video frames as closed-caption data. The method 400 then proceeds to step 402, described above.

Figure 5A:
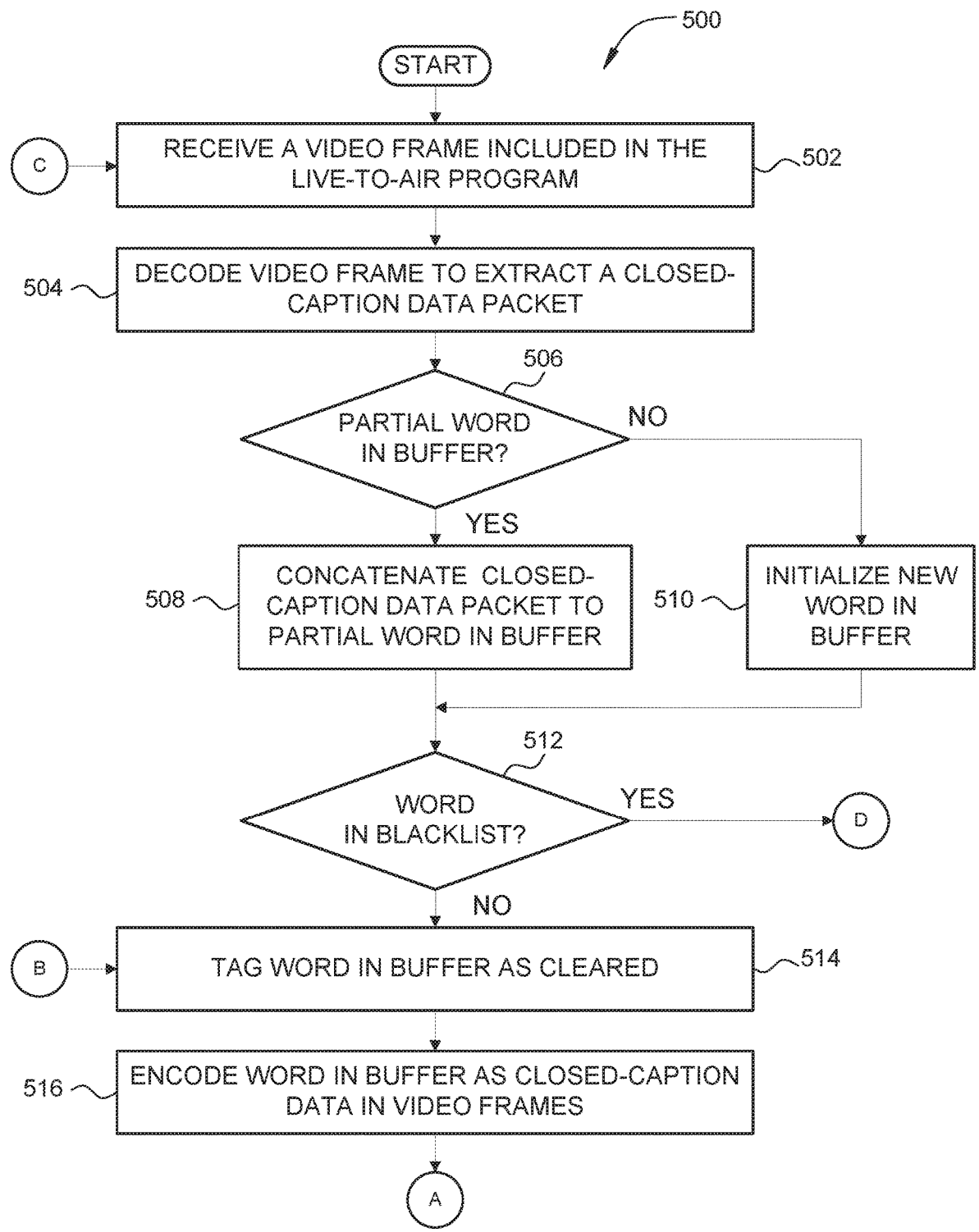
FIGS. 5A-5B set forth a flow diagram of method steps for automatically removing content from closed-caption data included in a pre-produced program, according to various embodiments of the present invention.
Figure 5B:
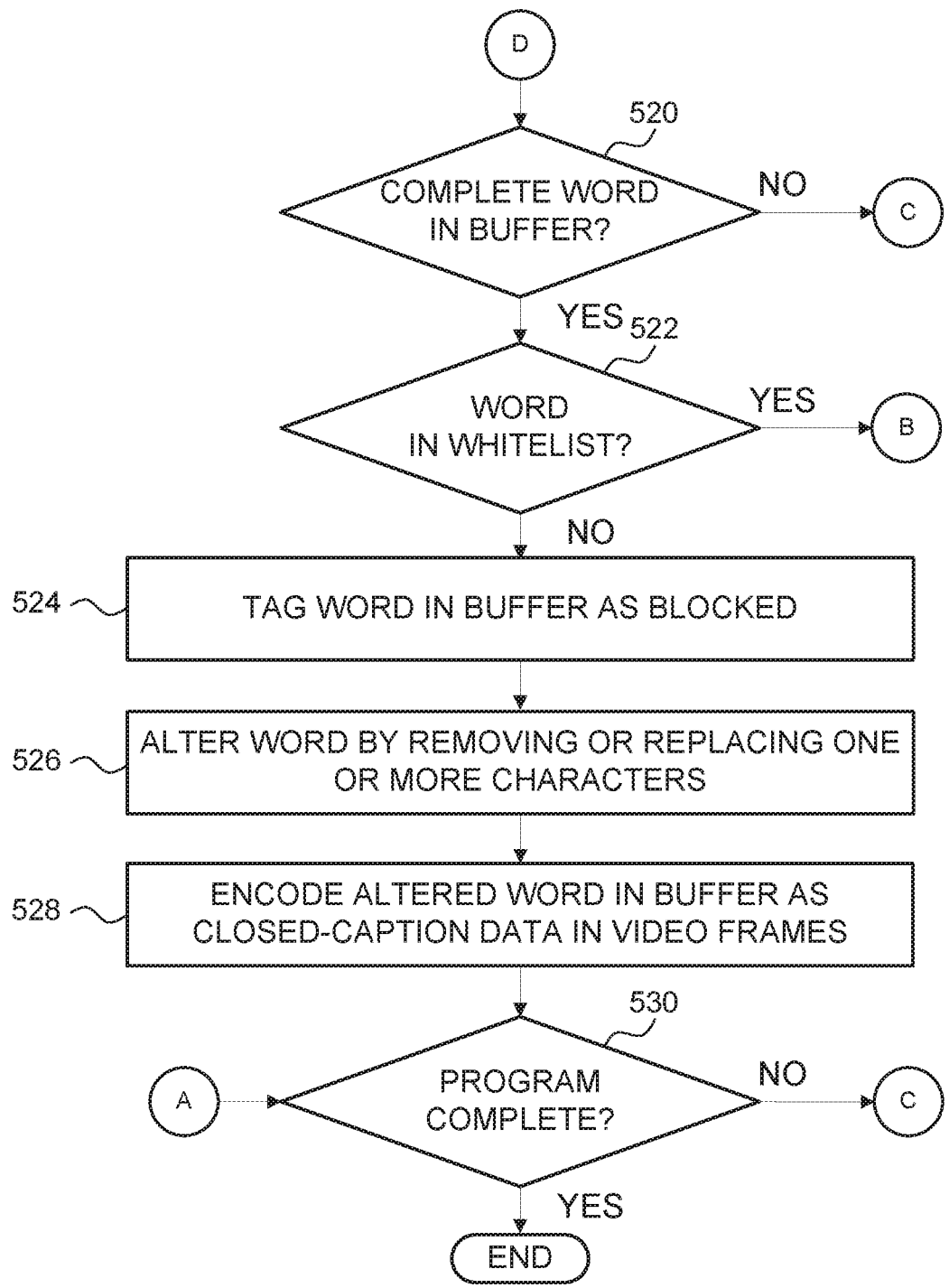

FIGS. 5A-5B set forth a flow diagram of method steps for automatically removing content from closed-caption data included in a pre-produced program, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 500 begins at step 502, where a closed-caption compliance application 332 executing on a closed-caption compliance system 112 receives a video frame of the pre-produced program that includes closed-caption data. The closed-caption data conforms to at least one of the EIA 608 and EIA 708 closed-caption standards. At step 504, closed-caption compliance application 332 decodes the video frame to extract a closed-caption data packet.

At step 506, closed-caption compliance application 332 determines whether a partial word is currently stored in a buffer within data store 342. If a partial word is currently stored in the buffer, then the method 500 proceeds to step 508, where closed-caption compliance application 332 concatenates the extracted closed-caption data packet to the partial word currently stored in the buffer. The method then proceeds to step 512. If, on the other hand, no partial word is currently stored in the buffer, then the method 500 proceeds to step 510, where closed-caption compliance application 332 initializes a new word by storing the extracted closed-caption data packet in the buffer. The method then proceeds to step 512, where closed-caption compliance application 332 determines whether any part of the current word in the buffer is included in any word in the blacklist. If no part of the current word in the buffer is included in any word in the blacklist, then the method proceeds to step 514, where closed-caption compliance application 332 tags the current word as cleared. At step 516, closed-caption compliance application 332 encodes the current word in the buffer into one or more video frames as closed-caption data.

At step 530, closed-caption compliance determines whether processing of the program is complete. If processing of the program is not complete, then the method 500 proceeds to step 502, described above. If processing of the program is complete, then the method 500 terminates.

Returning to step 512, if any part of the current word in the buffer is included in any word in the blacklist, then the method proceeds to step 520, where closed-caption compliance application 332 determines whether the current word stored in the buffer is a complete word. The current word stored in the buffer is a complete word if caption compliance application 332 detects a character that indicates the end of a word, such as a period, space, or hyphen. If the current word stored in the buffer is not a complete word, then the method proceeds to step 502, described above.

If, on the other hand, the current word stored in the buffer is a complete word, then the method proceeds to step 522, where closed-caption compliance application 332 determines whether the current word in the buffer is included in any word in the whitelist. If the current word in the buffer is included in any word in the whitelist, then the method 500 proceeds to step 514, described above. If, however, current word in the buffer is not included in any word in the whitelist, then the method 500 proceeds to step 524, where closed-caption compliance application 332 tags the current word as blocked. At step 526, closed-caption compliance application 332 alters the blocked word by removing or replacing one or more characters of the blocked word. At step 528, closed-caption compliance application 332 encodes the altered word into one or more video frames as closed-caption data.

At step 530, closed-caption compliance determines whether processing of the program is complete. If processing of the program is not complete, then the method 500 proceeds to step 502, described above. If processing of the program is complete, then the method 500 terminates.

In sum, closed-caption compliance application executing on a closed-caption compliance system automatically removes offensive content from closed-caption data embedded in a video signal. The closed-caption compliance application decodes closed-caption data packets from video frames in order to extract character strings, where each character string forms a partial word or a complete word. The closed-caption compliance application compares the partial words and complete words to words in a blacklist and a whitelist that are stored in a data library. If no part of the current word in the buffer is included in any word in the blacklist, then the closed-caption compliance application tags the current word as cleared.

If any part of the word in the buffer is included in any word in the blacklist, then the word may be an offensive word that should be removed or replaced. In such cases, the closed-caption compliance application proceeds differently depending on whether the current word is a complete word or a partial word. If the current word is a complete word, then closed-caption compliance application compares the current complete word stored in the buffer against the whitelist. If the current word matches any word on the whitelist, then closed-caption compliance application tags the current word as cleared. If the current word does not match any word on the whitelist, then closed-caption compliance application tags the current word as blocked. Closed-caption compliance application alters the word by removing or replacing one or more characters of the current word. If, on the other hand, the current word is a partial word, then closed-caption compliance application tags the current word as probationary because the current word may be offensive, depending on the remaining characters of the word. Closed-caption compliance application holds the partial word in the buffer and extracts additional characters from subsequent closed-caption data packets until the word is subsequently cleared or blocked. Closed-caption compliance application encodes the characters of the cleared words and the altered words as closed-caption data and embeds the closed-caption data into one or more video frames of the program.

At least one technical advantage of the disclosed techniques relative to the prior art is that offensive material in embedded closed-caption data can be automatically removed or replaced in both live-to-air and pre-produced programs anywhere in the video production pipeline. As a result, broadcasters can flexibly deploy the disclosed techniques at any one or more points in the video production pipeline based on where the programs are stored or distributed. Another technical advantage of the disclosed techniques relative to the prior art is that offensive material in embedded closed-caption data can be removed or replaced with little or no human intervention. Therefore, offensive material may be removed contemporaneously as a live-to-air program is being broadcast. Further, by eliminating manual reading and revising of decoded closed-caption text, offensive material may be removed from a pre-produced program even when the pre-produced program is delivered close to air time. As a result, offensive material is removed from closed-caption data with increased effectiveness and efficiency relative to prior techniques that involve human QC operators. These technical advantages represent one or more technological improvements over prior art approaches.

1. In some embodiments, a computer-implemented method for automatically removing content from closed-caption data embedded in a video signal, the method includes: decoding a first portion of a first video frame that includes a first closed-caption data packet; extracting a first character string that includes at least a portion of the first closed-caption data packet; determining whether the first character string is suitable for distribution to viewers; and if the first character string is suitable for distribution to viewers, then encoding at least a first portion of the first character string as a second closed-caption data packet to include in a second video frame, or if the first character string is not suitable for distribution to viewers, then: modifying the first character string to generate a second character string that is suitable for distribution to viewers; and encoding at least a first portion of the second character string as a third closed-caption data packet to include in the second video frame.

2. The computer-implemented method according to clause 1, wherein the first character string is suitable for distribution to viewers if no portion of the first character string is included in any word included in a blacklist.

3. The computer-implemented method according to clause 1 or clause 2, wherein the first character string is suitable for distribution to viewers if at least a portion of the first character string is included in a first word included in a blacklist and the at least a portion of the first character string is included in a second word included in a whitelist.

4. The computer-implemented method according to any of clauses 1-3, wherein the first character string is not suitable for distribution to viewers if at least a portion of the first character string is included in a first word included in a blacklist and no portion of the first character string is included in any word included in a whitelist.

5. The computer-implemented method according to any of clauses 1-4, wherein the first character string is suitable for distribution to viewers, and further comprising tagging the first character string as cleared.

6. The computer-implemented method according to any of clauses 1-5, the first character string is not suitable for distribution to viewers, and further comprising tagging the first character string as blocked.

7. The computer-implemented method according to any of clauses 1-6, further comprising: determining that the first character string includes a partial word; determining that the partial word is included in a first word included in a blacklist; and decoding a second portion of a second video frame that includes a second closed-caption data packet, wherein the first character string includes at least a portion of the second closed-caption data packet.

8. The computer-implemented method according to any of clauses 1-7, further comprising tagging the first character string as probationary.

9. The computer-implemented method according to any of clauses 1-8, wherein modifying the first character string to generate a second character string comprises replacing at least one character included in the first character string with a substitute character.

10. The computer-implemented method according to any of clauses 1-9, wherein modifying the first character string to generate a second character string comprises replacing at a word included in the first character string with a substitute word.

11. In some embodiments, one or more non-transitory computer-readable storage media include instructions that, when executed by one or more processors, cause the one or more processors to perform the steps of: decoding a first portion of a first video frame that includes a first closed-caption data packet; extracting a first character string that includes at least a portion of the first closed-caption data packet; determining whether the first character string is suitable for distribution to viewers; and if the first character string is suitable for distribution to viewers, then encoding at least a first portion of the first character string as a second closed-caption data packet to include in a second video frame, or if the first character string is not suitable for distribution to viewers, then: modifying the first character string to generate a second character string that is suitable for distribution to viewers; and encoding at least a first portion of the second character string as a third closed-caption data packet to include in the second video frame.

12. The one or more non-transitory computer-readable storage media according to clause 11, wherein the first character string is suitable for distribution to viewers if no portion of the first character string is included in any word included in a blacklist.

13. The one or more non-transitory computer-readable storage media according to clause 11 or clause 12, wherein the first character string is suitable for distribution to viewers if at least a portion of the first character string is included in a first word included in a blacklist and the at least a portion of the first character string is included in a second word included in a whitelist.

14. The one or more non-transitory computer-readable storage media according to any of clauses 11-13, wherein the first character string is not suitable for distribution to viewers if at least a portion of the first character string is included in a first word included in a blacklist and no portion of the first character string is included in any word included in a whitelist.

15. The one or more non-transitory computer-readable storage media according to any of clauses 11-14, wherein the first character string is suitable for distribution to viewers, and further comprising tagging the first character string as cleared.

16. The one or more non-transitory computer-readable storage media according to any of clauses 11-15, the first character string is not suitable for distribution to viewers, and further comprising tagging the first character string as blocked.

17. The one or more non-transitory computer-readable storage media according to any of clauses 11-16, wherein the first character string is suitable for distribution to viewers, and further comprising embedding the second closed-caption data packet as ancillary data in a video signal associated with the second video frame.

18. The one or more non-transitory computer-readable storage media according to any of clauses 11-17, wherein the first character string is not suitable for distribution to viewers, and further comprising embedding the third closed-caption data packet as ancillary data in a video signal associated with the second video frame.

19. The one or more non-transitory computer-readable storage media according to any of clauses 11-18, wherein the first closed-caption data packet conforms to at least one of the Consumer Electronics Association (CEA) 608 and CEA 708 standards.

20. In some embodiments, a computing device, includes: a memory that includes instructions; and a processor that is coupled to the memory and, when executing the instructions, is configured to: decoding a first portion of a first video frame that includes a first closed-caption data packet; extracting a first character string that includes at least a portion of the first closed-caption data packet; determining whether the first character string is suitable for distribution to viewers; and if the first character string is suitable for distribution to viewers, then encoding at least a first portion of the first character string as a second closed-caption data packet to include in a second video frame, or if the first character string is not suitable for distribution to viewers, then: modifying the first character string to generate a second character string that is suitable for distribution to viewers; and encoding at least a first portion of the second character string as a third closed-caption data packet to include in the second video frame.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically removing content from closed-caption data embedded in a video signal, the method comprising:
   decoding a first portion of a first video frame of the video signal, wherein the first portion includes a first closed-caption data packet;
   extracting a first character string that includes at least a portion of the first closed-caption data packet;
   determining whether the first character string is suitable for distribution to viewers;
   decoding a second video frame of the video signal;
   if the first character string is suitable for distribution to viewers, then encoding at least a first portion of the first character string as a second closed-caption data packet;
   if the first character string is not suitable for distribution to viewers, then:
      modifying the first character string to generate a second character string that is suitable for distribution to viewers; and
      encoding at least a first portion of the second character string as a third closed-caption data packet; and
   transmitting either the second closed-caption data packet or the third closed-caption data packet with the second video frame.

2. The computer-implemented method of claim 1, wherein the first character string is suitable for distribution to viewers if no portion of the first character string is included in any word included in a blacklist.

3. The computer-implemented method of claim 1, wherein the first character string is suitable for distribution to viewers if at least a portion of the first character string is included in a first word included in a blacklist and the at least a portion of the first character string is included in a second word included in a whitelist.

4. The computer-implemented method of claim 1, wherein the first character string is not suitable for distribution to viewers if at least a portion of the first character string is included in a first word included in a blacklist and no portion of the first character string is included in any word included in a whitelist.

5. The computer-implemented method of claim 1, wherein the first character string is suitable for distribution to viewers, and the computer-implemented method further comprises tagging the first character string as cleared.

6. The computer-implemented method of claim 1, wherein the first character string is not suitable for distribution to viewers, and the computer-implemented method further comprises tagging the first character string as blocked.

7. The computer-implemented method of claim 1, further comprising:
  determining that the first character string includes a partial word;
  determining that the partial word is included in a first word included in a blacklist; and
  decoding a second portion of a third video frame that includes a fourth closed-caption data packet,
  wherein the first character string includes at least a portion of the fourth closed-caption data packet.

8. The computer-implemented method of claim 7, further comprising tagging the first character string as probationary.

9. The computer-implemented method of claim 1, wherein modifying the first character string to generate the second character string comprises replacing at least one character included in the first character string with a substitute character.

10. The computer-implemented method of claim 1, wherein modifying the first character string to generate the second character string comprises replacing a word included in the first character string with a substitute word.

11. One or more non-transitory computer-readable storage media including instructions that, when executed by one or more processors, cause the one or more processors to perform the steps of:
  decoding a first portion of a first video frame of a video signal, wherein the first portion includes a first closed-caption data packet;
  extracting a first character string that includes at least a portion of the first closed-caption data packet;
  determining whether the first character string is suitable for distribution to viewers;
  decoding a second video frame of the video signal;
  if the first character string is suitable for distribution to viewers, then encoding at least a first portion of the first character string as a second closed-caption data packet;
  if the first character string is not suitable for distribution to viewers, then:
    modifying the first character string to generate a second character string that is suitable for distribution to viewers; and
    encoding at least a first portion of the second character string as a third closed-caption data packet; and
  transmitting either the second closed-caption data packet or the third closed-caption data packet with the second video frame.

12. The one or more non-transitory computer-readable storage media of claim 11, wherein the first character string is suitable for distribution to viewers if no portion of the first character string is included in any word included in a blacklist.

13. The one or more non-transitory computer-readable storage media of claim 11, wherein the first character string is suitable for distribution to viewers if at least a portion of the first character string is included in a first word included in a blacklist and the at least a portion of the first character string is included in a second word included in a whitelist.

14. The one or more non-transitory computer-readable storage media of claim 11, wherein the first character string is not suitable for distribution to viewers if at least a portion of the first character string is included in a first word included in a blacklist and no portion of the first character string is included in any word included in a whitelist.

15. The one or more non-transitory computer-readable storage media of claim 11, wherein the first character string is suitable for distribution to viewers, and further comprising tagging the first character string as cleared.

16. The one or more non-transitory computer-readable storage media of claim 11, the first character string is not suitable for distribution to viewers, and further comprising tagging the first character string as blocked.

17. The one or more non-transitory computer-readable storage media of claim 11, wherein the first character string is suitable for distribution to viewers, and further comprising embedding the second closed-caption data packet as ancillary data in the video signal associated with the second video frame.

18. The one or more non-transitory computer-readable storage media of claim 11, wherein the first character string is not suitable for distribution to viewers, and further comprising embedding the third closed-caption data packet as ancillary data in the video signal associated with the second video frame.

19. The one or more non-transitory computer-readable storage media of claim 11, wherein the first closed-caption data packet conforms to at least one of the Consumer Electronics Association (CEA) 608 or CEA 708 standards.

20. A computing device, comprising:
  a memory that includes instructions; and
  a processor that is coupled to the memory and, when executing the instructions, is configured to:
    decode a first portion of a first video frame of a video signal, wherein the first portion includes a first closed-caption data packet;
    extract a first character string that includes at least a portion of the first closed-caption data packet;
    determine whether the first character string is suitable for distribution to viewers;
    decode a second video frame of the video signal;
    if the first character string is suitable for distribution to viewers, then encode at least a first portion of the first character string as a second closed-caption data packet;
    if the first character string is not suitable for distribution to viewers, then:
      modify the first character string to generate a second character string that is suitable for distribution to viewers; and encode at least a first portion of the second character string as a third closed-caption data packet; and
transmit either the second closed-caption data packet or the third closed-caption data packet with the second video frame.

\* \* \* \* \*